(12) United States Patent
Imamura et al.

(10) Patent No.: US 8,022,992 B2
(45) Date of Patent: Sep. 20, 2011

(54) DATA PROCESSING SYSTEM, DATA PROCESSING DEVICE, IMAGE DISPLAY DEVICE, AND RECORDING MEDIUM THAT RECORDS PROCESSING PROGRAM THEREOF

(75) Inventors: Keiichi Imamura, Hamura (JP); Junichi Miyasaka, Hachioji (JP); Kazunori Yanagi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 871 days.

(21) Appl. No.: 11/888,065

(22) Filed: Jul. 31, 2007

(65) Prior Publication Data
US 2008/0043290 A1    Feb. 21, 2008

(30) Foreign Application Priority Data
Aug. 2, 2006   (JP) .................. 2006-210967

(51) Int. Cl.
  H04N 5/225    (2006.01)
  H04N 5/222    (2006.01)
(52) U.S. Cl. ............ 348/207.1; 348/207.99; 348/333.01
(58) Field of Classification Search ............... 348/207.1, 348/333.02, 207.11; 455/556.1, 556.2
See application file for complete search history.

(56) References Cited

U.S. PATENT DOCUMENTS

| | | | |
|---|---|---|---|
| 6,888,569 B2 | 5/2005 | Fox et al. | |
| 6,954,229 B1 * | 10/2005 | Otala | 348/231.99 |
| 7,388,606 B2 | 6/2008 | Fox et al. | |
| 7,656,400 B2 | 2/2010 | Oka et al. | |
| 2003/0122940 A1 * | 7/2003 | Myojo | 348/231.2 |
| 2003/0174127 A1 | 9/2003 | Oka et al. | |
| 2004/0066459 A1 | 4/2004 | Fox et al. | |
| 2005/0010562 A1 | 1/2005 | Nagasaka | |
| 2005/0140788 A1 | 6/2005 | Fox et al. | |

FOREIGN PATENT DOCUMENTS

| | | |
|---|---|---|
| CN | 1551016 A | 12/2004 |
| EP | 1473643 A2 | 3/2004 |
| FR | 2839795 A1 | 11/2003 |
| JP | 2000-350151 A | 12/2000 |
| JP | 2002-366561 | 12/2002 |
| JP | 2005-018734 A | 1/2005 |

(Continued)

OTHER PUBLICATIONS

English Language International Search Report and Written Opinion dated Jun. 30, 2008 issued in counterpart Appln. No. PCT/JP2007/065118.

(Continued)

*Primary Examiner* — David Ometz
*Assistant Examiner* — Richard Bemben
(74) *Attorney, Agent, or Firm* — Holtz, Holtz, Goodman & Chick, PC

(57) ABSTRACT

When directed to transmit data in a personal computer (1), a document image data generating section (22) generates document image data obtained by imaging a document content based on document data for every page. An index image generating section (23) composites a file name of the document data and icon image data corresponding to application software by which the document data is created, and thereby generates index image data. The folder generating section (26) generates a PC folder based on the document image data, the index image data, and the management data, and generated by a management file generating section (24) transmits the PC folder to a digital camera (51) via a data transmitting section (27).

1 Claim, 14 Drawing Sheets

FOREIGN PATENT DOCUMENTS

KR    2005-0083715    8/2005

OTHER PUBLICATIONS

Korean Office Action dated Oct. 29, 2010 and English translation thereof in counterpart Korean Application No. 10-2009-7002163.

Japanese Office Action dated Sep. 27, 2010 and English translation thereof in counterpart Japanese Application No. 2006-210967.

Chinese Office Action dated Sep. 9, 2010 and English translation thereof in counterpart Chinese Application No. 200780036877.4.

* cited by examiner

| EXTENSION (DOCUMENT TYPE) | ICON |
|---|---|
| EXTENSION: .aaa<br><br>DOCUMENT TYPE: DOCUMENT TEXT |  |
| EXTENSION: .bbb<br><br>DOCUMENT TYPE: SPREADSHEET |  |
| EXTENSION: .ccc<br><br>DOCUMENT TYPE: PRESENTATION |  |
| EXTENSION: .book<br><br>DOCUMENT TYPE: ELECTRONIC BOOK |  |
| EXTENSION: .htm/.html<br><br>DOCUMENT TYPE: WEB PAGE |  |
| EXTENSION: .txt/.text<br><br>DOCUMENT TYPE: PLAIN TEXT |  |
| ⋮ | ⋮ |

FIG. 3A
企画書案.aaa
FIG. 3B
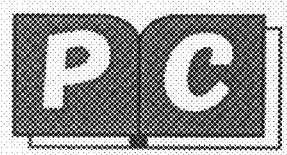
企画書案.aaa
FIG. 3C
PC DATA LIST
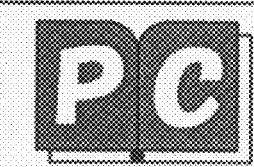
企画書案.aaa
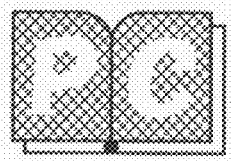
四半期売り上げ予測.bbb
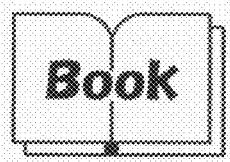
世界の端で秋を囁く.book
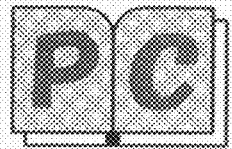
技術資料.ccc
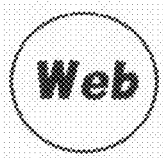
3秒クッキング.html
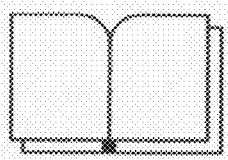
unknown

DISPLAY CHARACTER IMAGE DATA SENT FROM PERSONAL COMPUTER

Direct input

DISPLAY CHARACTERS INPUTTED ON DIGITAL CAMERA

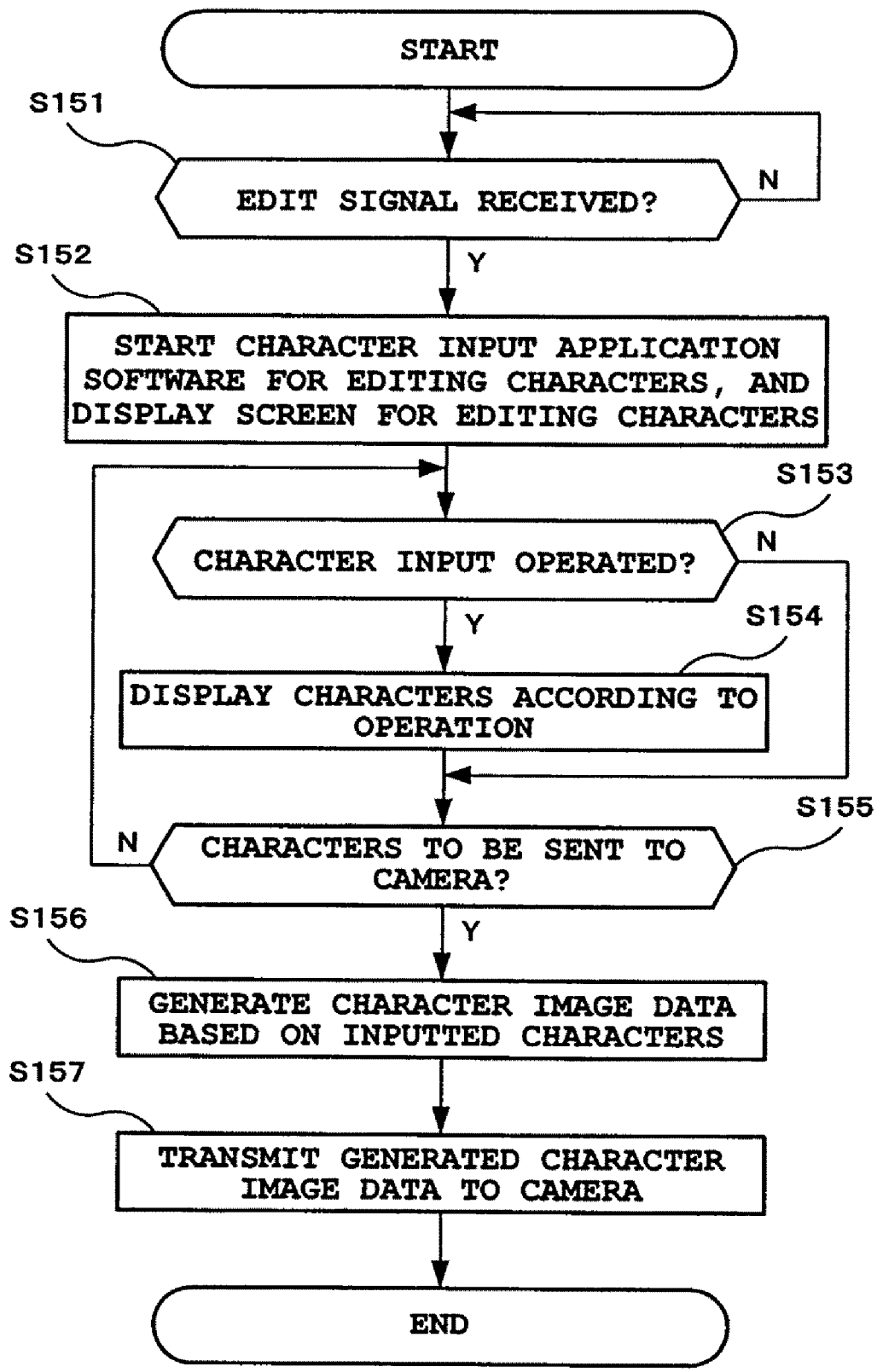

DATA PROCESSING SYSTEM, DATA PROCESSING DEVICE, IMAGE DISPLAY DEVICE, AND RECORDING MEDIUM THAT RECORDS PROCESSING PROGRAM THEREOF

CROSS-REFERENCE TO RELATED APPLICATION

This application is based upon and claims the benefit of priority from the prior Japanese Patent Application No. 2006-210967, filed Aug. 2, 2006, the entire contents of which is incorporated herein by reference.

BACKGROUND OF THE INVENTION

1. Field of the Invention

The present invention relates to a data processing system, a data processing device, an image display device, and a recording medium that records a processing program thereof, more particularly to a data processing system that can display data generated by a data processing device on an image display device, a data processing device, a data display device, and a program thereof.

2. Description of the Related Art

For the past number of years, for example, in an image display device such as a digital camera, no internal general font data has been installed, but an internal imaged language message has been displayed. The general font data means the raster font set or the vector font set that is intended for displaying (or printing) general characters including full size Chinese characters, Japanese hiragana and the like other than half size alphanumeric characters.

The foregoing general font data means a font data set for displaying general characters used for recording an ordinary document text or the like that is composed of about 6000 to 7000 characters in the case of Japanese language or about 50 to 100 characters in the case of European and American languages.

In general, a digital camera has the font data of half size alphanumeric characters, but does not have the general font data. Therefore, even when a character code string such as a general text is sent from the outside to the digital camera, it is not possible to reproduce a character image corresponding to the character codes and display the character image on the camera monitor.

In addition, it is needless to say that the digital camera does not have a means for comprehending data of word processor software, spreadsheet software, and application software for web pages and the like. Therefore, the digital camera is not able to display document data or the like generated by the application software on a personal computer.

In view of the foregoing problems, the following technology has been introduced (for example, refer to Japanese Laid-Open Patent Publication No. 2000-350151). In the technology, a document text of document data generated on a computer is converted to image data, and the converted image data is transmitted to a digital camera. Thereby, the document text generated on the computer can be displayed on the digital camera.

However, according to the technology disclosed in the foregoing Japanese Laid-Open Patent Publication, though the document created on the computer can be displayed on the digital camera, the image data is simply transmitted to the digital camera. Thus, it is not clear to which document content the image data corresponds. In result, in the case that much image data has been transmitted to the digital camera, it becomes difficult to search for the image data for displaying a desirable document, leading to unavailability.

Further, it is not possible to find by which type of software the document of the transmitted image data is created (for example, document text data created by word processor software, chart data created by spreadsheet software or the like), resulting in unavailability.

Further, property information of captured image data such as a user name is inputted on the digital camera. However, it is not possible to display the property information with the use of general characters incapable of being displayed on the digital camera.

SUMMARY OF THE INVENTION

In accordance with an aspect of the present invention, there is provided a data processing system for transmitting a data file stored in a data processing device to an image display device, the data processing device comprises: a file name acquiring means for acquiring character codes of a plurality of characters composing a file name of the data file; a file name image generating means for generating file name image data by imaging the respective character codes acquired by the file name acquiring means according to font data, and arranging and compositing images of the respective characters according to a sequence of the characters in the file name; and a transmitting means for transmitting the data file including the file name image data generated by the file name image generating means to the image display device, the image display device comprises: a receiving means for receiving and storing the data file transmitted from the data processing device; an identifying means for identifying the data file including the file name image data out of data files that have been received and stored by the receiving means; and a first display controlling means for extracting the file name image data from the data file including the file name image data identified by the identifying means, and arranging and displaying the extracted file name image data on a display screen for displaying the file name of the data file.

In accordance with another aspect of the present invention, there is provided a data processing system for displaying character data generated by a data processing device on a capture apparatus, wherein, the data processing device comprises: an inputting means for inputting characters by a user; a character image generating means for generating character image data obtained by imaging the characters inputted by the inputting means based on character data of the characters; and a transmitting means for transmitting the character image data generated by the character image generating means, the capture apparatus comprises: a capture controlling means for capturing an object; a first record controlling means for recording captured image data captured by the capture controlling means in a recording means; a receiving means for receiving the character image data transmitted from the transmitting means; a record controlling means for recording the character image data received by the receiving means as property information of the captured image data recorded in the recording means in association with the captured image data; and a display controlling means for displaying the character image data recorded as the property information of the captured image data recorded in the recording means in association with the captured image data on a display means.

In accordance with another aspect of the present invention, there is provided an image display device comprising: an image storing means for storing image data and property information of the image data shown with the use of a character string in association with each other in a storing means;

a property display means for displaying the property information in association with the image data stored in the storing means in a form recognizable as the character string by a user on a screen; and a property image acquiring means for acquiring the property information shown with the use of the character string as an property image in a state that the character string is developed as an image from a data processing device, wherein, the image storing means stores the property image acquired by the property image acquiring means as the property information in association with the image data, and the property display means acquires the property image in association with the image data from the storing means, and displays the property information of the image data based on the property image in the form recognizable as the character string by the user on the screen.

In accordance with another aspect of the present invention, there is provided a data processing device comprising: a document storing means for storing a document file storing document data generated by application software; a document image generating means for generating document image data by imaging a document content of the document data; a property image generating means for generating a property image by imaging a character string representing a file name of the document file according to font data; and a transmitting means for transmitting the document image data generated by the document image generating means and the property image generated by the property image generating means in association with each other to an image display device.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3A shows generated name image data, FIG. 3B shows index image data, and FIG. 3C shows multiply displayed index image data;

FIG. 13 is a flowchart showing operations of the personal computer 1 of the second embodiment.

DETAILED DESCRIPTION OF THE PREFERRED EMBODIMENTS

The present invention will hereinafter be described in detail with reference to the preferred embodiments shown in the accompanying drawings.

First Embodiment

A. Structure of Data Processing System

Figure 1:
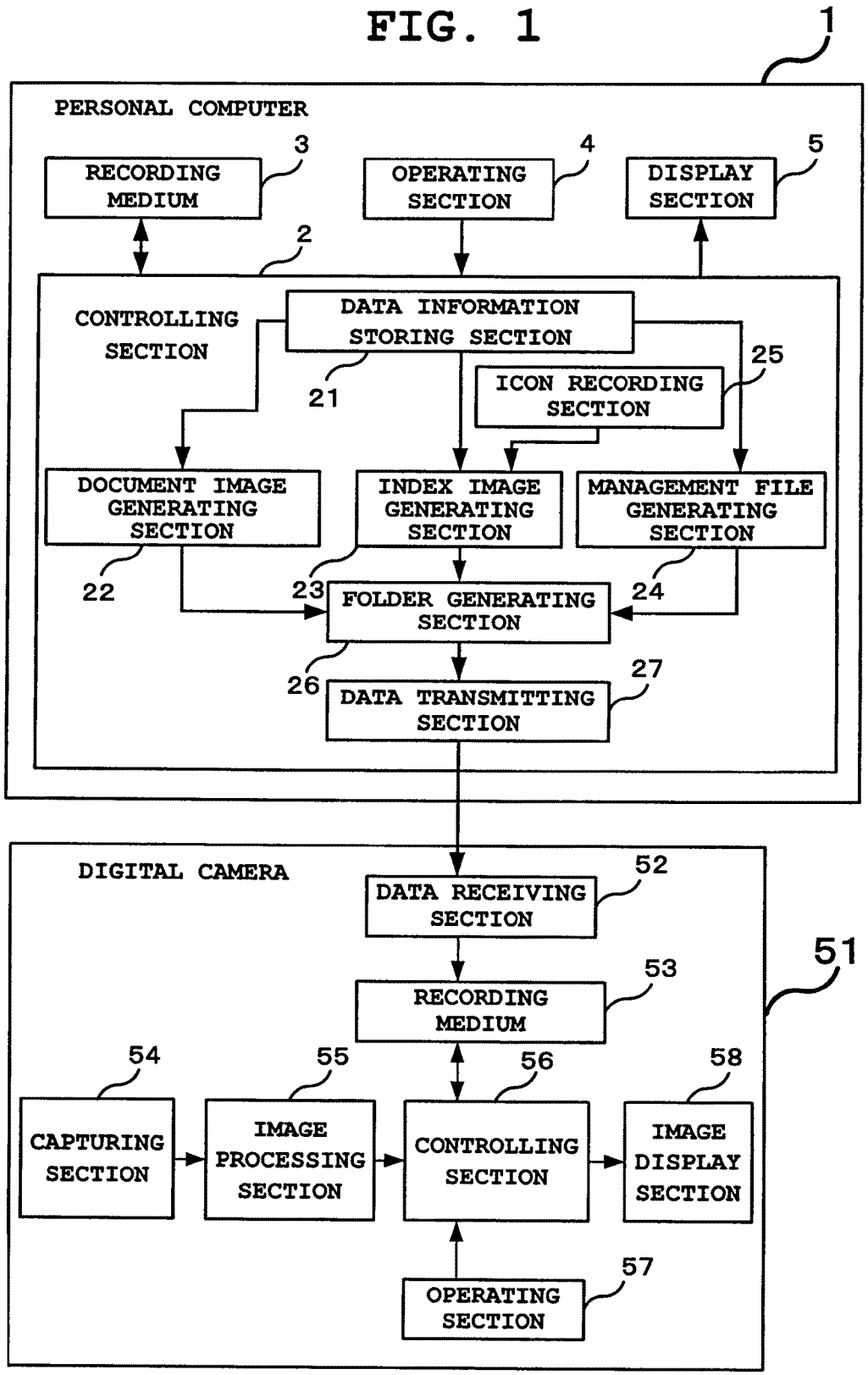
FIG. 1 is a diagram showing a schematic structure of a data processing system according to a first embodiment of the present invention.

FIG. 1 is a diagram showing a schematic structure of the data processing system according to the present invention.

The data processing system includes a personal computer 1 and a digital camera 51.

The personal computer 1 is composed of a controlling section 2, a recording medium 3 (a recording means), an operating section 4, and a display section 5. The controlling section 2 (a file name acquiring means) has a data information storing section 21 (a document storing means), a document image generating section 22 (a document image generating means), an index image generating section 23 (a file name image generating means, an index image generating means, a character image generating means, and a property image generating means), a management file generating section 24, an icon recording section 25, a folder generating section 26, and a data transmitting section 27 (a transmitting means).

The digital camera 51 includes a data receiving section 52 (a receiving means, an image receiving means, and a document image acquiring means), a recording medium 53 (a recording means), a capturing section 54 (a capturing means), an image processing section 55, a controlling section 56 (a record controlling means, a reading means, a designating means, a first display controlling means, a second display controlling means, an identifying means, a display controlling means, a processing means, an image storing means, a property display means, a property image acquiring means, a property code acquiring means, and a reading means), an operating section 57 (a page designating means, a designating means, and a selecting means), and an image display section 58.

First, a description will be given of a structure of the personal computer 1.

The recording medium 3 is an internal memory for storing data such as hard disc and nonvolatile memory data. In the recording medium 3, starting with the OS software, various application software (word processor software, spreadsheet software, presentation software, web browser and the like) are recorded. In addition, in the recording medium 3, data (document data) of a document text and a chart created by the application software, a web page displayed over the Internet or the like is recorded.

The operating section 4 includes a mouse and a keyboard. The operating section 4 outputs an operation signal corresponding to a user's operation to the controlling section 2.

The display section 5 displays the document text data created by the word processor software and web page data downloaded with the use of the web browser stored in the data information storing section 21. The personal computer 1 includes a LAN connectable to the Internet (not shown). The personal computer 1 can connect to the Internet.

The data information storing section 21 of the controlling section 2 temporarily stores the created data and the downloaded data based on the application software such as the word processor software and the web browser.

The controlling section 2 displays a screen of document data by using the application software used for creating the document data stored in the data information storing means 21. Then, the document data is displayed based on page information (data related to the displayed page count such as page break information, font information, layout information, and page setting information) associated with or added to the document data. For example, when document text data (document data created by word processor software) is stored in the data information storing section 21, a document text based on the stored document text data is displayed on the display section 5 based on the page information such as the character font and the page break information, since the displayed page count varies according to the size of the character font and the page break information. In addition, when the document data is displayed, a save icon (or a save button), a transmission/print icon (or a transmit/print button) and the like are also displayed based on the application software.

When the mouse and the keyboard of the operating section 4 is operated to change the document data, the controlling section 2 changes the document data stored in the data information storing section 21 according to the operation on the mouse and the keyboard. For example, in the case that document text data is stored in the data information storing section 21, when the keyboard is operated to add or delete characters, the stored document data is changed according to the operation on the keyboard. Then, it is needless to say that a screen based on the changed document data is displayed on the display section 5.

The data information storing section 21 stores the file name and the page information of the data together with the stored document data.

When the above-mentioned transmission/print icon is clicked by a user's operation on the operating section 4, the controlling section 2 operates as follows.

The document image generating section 22 divides the document data stored in the data information storing section 21 into every page based on the page information. Then, for each data divided into every page (each divided data), the document image generating section 22 generates each image data (document image data) based on the page information such as the font information and the layout information, and thereby generates each image file (document image file).

That is, according to the page count of the screen displayed based on the document data, the document image creating section 22 creates each document image data. For example, when the page count of the displayed screen is 6, 6 pieces of document image data are generated, and thus the number of document image files to be generated is 6.

Thereby, the document image data displayed on the display section 5 is created for every page.

The method of generating the document image data is similar to that in the case of printing the document data. That is, when the document data is printed, the image data is generated for every page. The image data is created by the method similar to that in the case of printing the image data.

In this case, the page count is 6. Therefore, the document data is divided into 6, and thus 6 document image files are generated. File names of the respective document image files are set as "VIEW0001.JPG," "VIEW0002.JPG," . . . "VIEW0005.JPG," and "VIEW0006.JPG." The file names are automatically given. The file name is shown with the use of half size alphanumeric characters according to DCF standard. The numbers of the file names correspond to the respective pages. For example, the image file named "VIEW0001.JPG" represents the document image data of the first page, and the image file named "VIEW0006.JPG" represents the document image data of the 6th page.

The generated document image files are outputted to the folder generating section 26.

The index image generating section 23 reads icon image data of the icon corresponding to the extension of the file name of the document data stored in the data information storing section 21 from the icon recording section 25, and generates name image data based on the file name. The name image data is data obtained by imaging the file name composed of general characters such as Chinese characters, Japanese hiragana and the like (composed of full size character codes).

The index image generating section 23 composites the read icon image data and the generated name image data, generates an index image file, and outputs the index image file to the folder generating section 26 (the icon image data is not necessarily composited, and the index image file may be composed of only the name image data).

Figure 2:
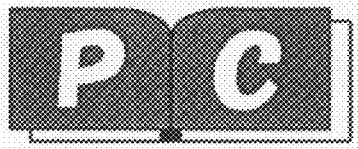
FIG. 2 is a diagram showing images of icon image data stored in an icon recording section 25.
Figure 2:
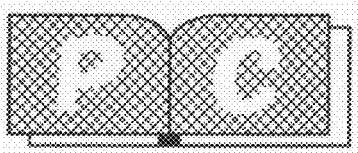
Figure 2:
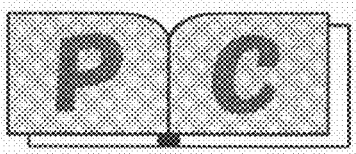
Figure 2:
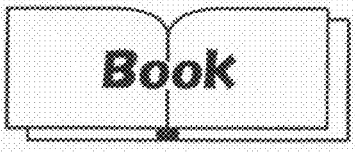
Figure 2:
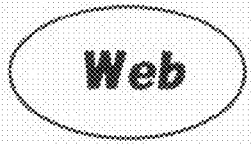
Figure 2:
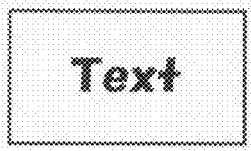

FIG. 2 is a view showing images of icon image data stored in the icon recording section 25.

For every extension, a different icon is respectively recorded.

For example, the extension of document text data created by word processor software is ".aaa." Meanwhile, the extension of chart data created by spreadsheet software is ".bbb." The extension of web page data downloaded with the use of a web browser is ".htm" or ".html." The extension of text data created by a text editor is ".txt" or ".text."

Next, a description will be given of generating the index image data in detail.

The index image generating section 23 acquires a plurality of character codes representing the file name of the document data stored in the data information storing section, and acquires information of the standard font (including full size use font) used for OS display. The index image generating section 23 develops, rasterizes, and images the plurality of character codes representing the file name based on the acquired standard font, and thereby generates the name image data.

For example, when the file name of the document data is "企画書案.aaa," the image of the created name image data is as shown in FIG. 3A. The size of the generated name image data is previously determined.

The index image generating section 23 acquires the image data of the icon corresponding to the extension of the file name from the icon recording section 25. In this case, the extension of the file name is ".aaa." Therefore, the index image generating section 23 acquires the image data of the icon corresponding to the extension ".aaa." The extension ".aaa" indicates that the file name belongs to data created by word processor software.

The index image generating section 23 composites the generated name image data (refer to FIG. 3A) and the read icon image data, and thereby generates index image data and generates an index image file. The file name of the generated index image file is set as "INDEX.JPE."

FIG. 3B is a view showing the generated index image data.

As evidenced by FIG. 3B, the generated index image data is image data in which the icon image data and the name image data are combined.

The management file generating section 24 generates a management file that stores listing information of document page files to be transmitted and the file name of the document data with the use of character codes on the basis of the data and the file name stored in the data information storing section 21, and outputs the management file to the folder generating section 26.

The folder generating section 26 acquires the document image file, the index image file, and the management file from the document image generating section 22, the index image generating section 23, and the management file generating section 24. After that, the folder generating section 26 generates a PC folder based on the acquired files, and then outputs the PC folder to the transmitting section 27.

Figure 4:
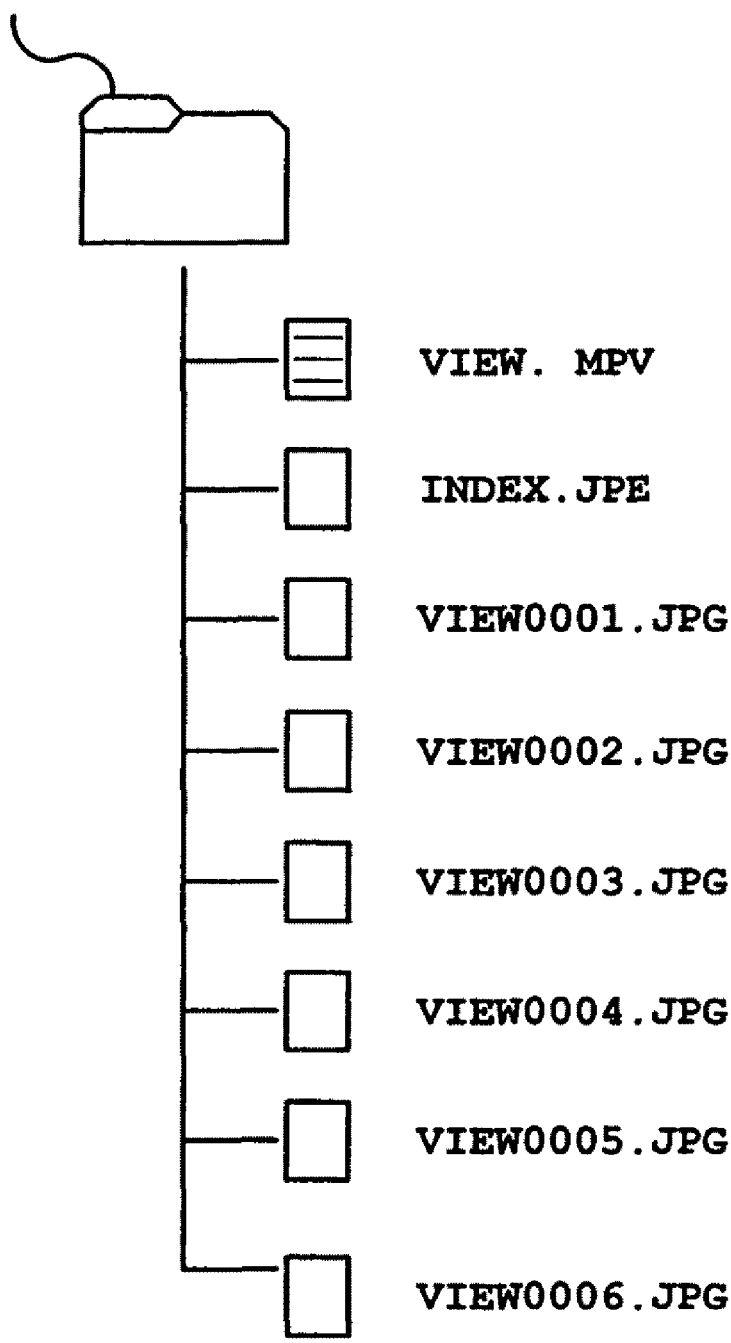
FIG. 4 is a view showing a generated PC folder.

FIG. 4 is a view showing the generated PC folder.

As shown in FIG. 4, in the generated PC folder, the management file "VIEW.MPV," the index image file "INDEX.JPE" in which the index image is recorded, and the image files "VIEW0001.JPG," "VIEW0002.JPG," . . . "VIEW0005.JPG," and "VIEW0006.JPG" in which the document image data are recorded, are stored.

When the folder generating section 26 creates the PC folder, the folder generating section 26 automatically determines the folder name of the created folder. The folder name has the number, which corresponds to the number of files created by the folder generating section 26. For example, when the folder generating section 26 generates the first PC folder, the folder name thereof becomes "001_VIEW." Meanwhile, when the folder generating section 26 generates the fifth PC folder, the folder name thereof becomes "005_VIEW."

The data transmitting section 27 transmits the PC folder data sent from the folder generating section 26 to the file receiving section 52 of the digital camera 51. Such transmission is made based on DCF standard.

Next, a description will be given of a structure of the digital camera 51.

The data receiving section 52 receives the transmitted PC folder data, and records the received PC folder data in a PC data recording region of the recording medium 53.

The personal computer 1 and the digital camera 51 send and receive data according to various interface standards such as USB (Universal Serial Bus) standard and IEEE 1394 standard, infrared communications based on IrDA standard, and Bluetooth standard, and are in a state capable of sending and receiving data.

The capturing section 54 includes an optical lens, a CCD, an A/D and the like. The capturing section 54 converts an image of an object that is imaged via the lens to an electrical signal, and outputs the image as image data of a digital signal to the image processing section 55.

The image processing section 55 provides processing such as γ correction processing and white balance processing for the sent image data. The image processing section 55 generates a luminance color difference signal (YUV data), and outputs image data of the generated luminance color difference signal to the controlling section 56.

The controlling section 56 is a one chip micro computer that records the sent image data in an image recording region of the recording medium 53, displays the sent image data on the image display section 58, and controls the respective sections of the digital camera 51.

The operating section 57 includes a plurality of operation keys such as a shutter button, a mode key, cross keys, and a SET key. The operating section 57 sends an operation signal corresponding to a key operation to the controlling section 56.

Next, a description will be given of a method of displaying the PC folder recorded in the recording medium 53 by the data receiving section.

When document display mode is set by user's operation on the mode key of the operating section 57, the controlling section 56 reads the index image data of "INDEX.JPE" from each PC folder recorded in the PC data recording region of the recording medium 53 (reads image data with the extension of ".JPE"), and multiply displays images of the read index image data on the image display section 58. Thereby, icons showing file names and extensions of the document data recorded in the plurality of PC folders can be multiply displayed.

Then, when a PC folder not recording image data of "INDEX. JPE" exists, a given image is displayed as an index image of the file.

In this case, 6 files are recorded in the PC data recording region. FIG. 3C is a view showing the case that the image data of "INDEX.JPE" of each file is multiply displayed.

As evidenced by FIG. 3C, the index images generated by the index image generating section 23 of the personal computer 1 are displayed. By viewing the type of each displayed icon and the extension of each file name displayed under each icon, by which application software a document is created can be found.

Further, the icon reading <unknown> is the index image of the folder in which an image file of "INDEX.JPE." is not recorded.

In FIG. 3C, the icon surrounded with the frame, that is, the icon of "企画書案.aaa" is selected. When a user operates the cross keys of the operating section 57, the user can select other index image (icon). That is, according to the operation on the cross keys, the controlling section 56 selects other index image, and the selected index image is surrounded with a frame.

When the user desires to view the document content of the selected index image, the user can view the document content by operating the SET key.

For example, when the user operates the SET key in a state that "企画書案.aaa" is selected, the document data content of the 企画書案 is displayed on the image display section 58.

For displaying the document data content, the document image data recorded in the PC folder to which the image data of the selected index image (INDEX.JPE) belongs is displayed. That is, the document data converted to the image data is displayed.

Then, the document image data with the smallest number of the document image file name, that is, the document image data of "VIEW0001.JPG" shown in FIG. 4 is displayed on the image display section 58.

When the user operates "↓" key out of the cross keys, the document image data with the next number is displayed. When the user operates "↑" key, the document image data with the previous number is displayed. When the user operates "↑" key in a state that the first document image data, that is, the image data of "VIEW0001.JPG" shown in FIG. 4 is displayed, no previous document image data exists. Thus, in this case, the currently displayed image data may be continuously displayed, or the last image data may be displayed.

When the user operates "↓" key in a state that the last document image data, that is, the document image data of "VIEW0006.JPG" shown in FIG. 4 is displayed, no next document image data to be displayed exists. Thus, in this case, the currently displayed document image data may be continuously displayed, or the first document image data may be displayed.

Thereby, document data, chart data, web pages and the like displayed on the personal computer can be also displayed on the digital camera 51.

B. Operations of Data Processing System

A description will be given of operations of the data processing system in the first embodiment.

First, a description will be given of operations of the personal computer 1 to generate image data based on document data and transmit the image data to the digital camera 51. After that, a description will be given of operations of the digital camera 51 to display the transmitted image data.

B-1. Operations of Personal Computer 1

Figure 5:
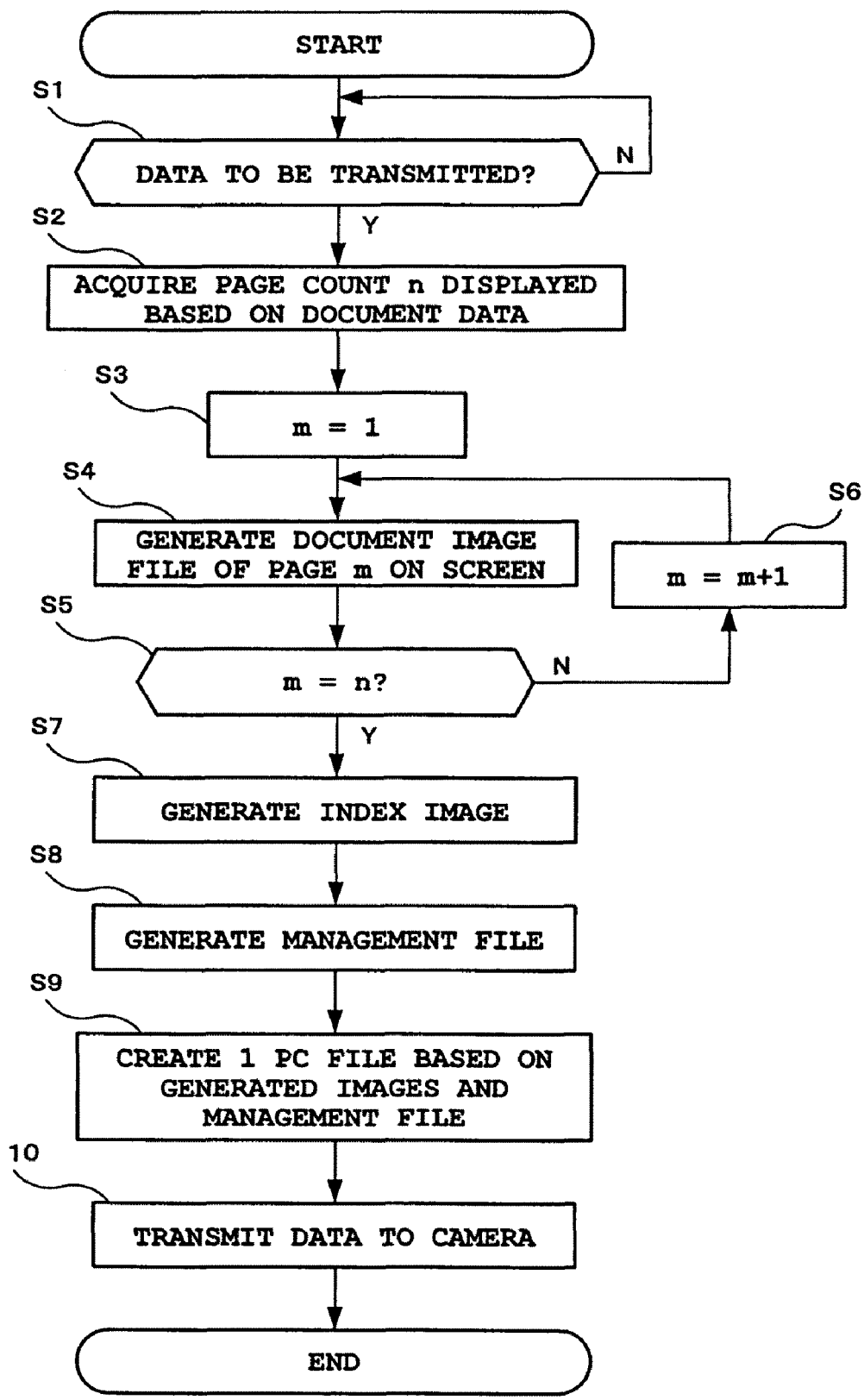
FIG. 5 is a flowchart showing operations of a personal computer 1 of the first embodiment.

A description will be given of the operations of the personal computer 1 with reference to the flowchart of FIG. 5.

When a screen based on document data created by application software (document data stored in the data information storing section 21) is displayed on the display section 5, the controlling section 2 determines whether or not an image of the displayed screen is to be transmitted to the digital camera 51 (Step S1). Such determination is made based on whether or not the displayed transmission/print icon is clicked.

Then, the personal computer 1 and the digital camera 21 are in a state capable of transmitting and receiving data.

When determining that the image is not to be transmitted in Step S1, the procedure is stopped at Step S1 until a determination is made that the image is to be transmitted. When determining that the image is to be transmitted, the controlling section 2 controls the document image creating section 22 to acquire the page count n of the displayed screen based on the document data (Step S22). The page count is determined based on the page information added to the document data.

Next, the document image creating section 22 sets the page numberm of image data to be created to 1 (Step S3), and generates the document image data displayed on the page number m to generate an image file (Step S4). Then, the document image creating section 22 automatically gives the file name of the generated image file based on DCF standard. The file name includes at least the generated page number m. In this case, the file name is shown as "VIEWxxxx.JPG," in which "xxxx" represents the page number. For example, when the document image file of the first page is generated, the file name is "VIEW0001.JPG."

Then, the document image generating section 22 divides the document data stored in the data information storing section 21 into every page based on the page information, reads the document text data corresponding to the page number m, and generates image data based on the document data corresponding to the page number m read based on the page information such as font information and layout information. For example, when the document data is document text data, document text image data displayed on the page number m is generated.

Next, the document image generating section 22 determines whether or not m is n (Step S5).

When determining that m is not n in Step S5, m is incremented by 1 (Step S6), and the procedure is returned back to Step S4. That is, the image data of the next page is to be generated.

Meanwhile, when determining that m is n in Step S5, the controlling section 2 determines that all image files of the screen displayed based on the document data are generated, and controls the index image generating section 23 to generate an index image (Step S7).

Specifically, first, the index image generating section 23 acquires the file name of the document data stored in the data information storing section 21, and acquires information of the standard font used for OS display. Then, the index image generating section 23 develops and rasterizes character codes of each character (including full size 2 bite code) composing the acquired file name based on the acquired standard font and composites the image thereof, and thereby generates the image data of the file name (name image data). Such image composition is made by sequentially lining and arranging the developed and rasterized each character image in a frame with the size previously defined between the personal computer and the digital camera. The number of characters arranged in the frame vertically and horizontally is also previously defined between the personal computer and the digital camera. In the example shown in FIGS. 3A to 3C, up to 2 characters and up to 7 characters can be arranged vertically and horizontally. In the case that a plurality of lines are needed to fill in the file name, image composition is made by folding back the characters at the right end of the first line.

The index image generating section 23 acquires icon image data corresponding to the extension of the file name of the document data from the icon recording section 25. The index image generating section 23 composites the acquired icon image data and the generated name image data, and thereby generates index image data. Based on the generated index image data, the index image generating section 23 generates the image file (index image file).

For example, when the document data is document text data, and the file name of the document text data is "企画書案.aaa," the image of the generated name image data is as shown in FIG. 3A. The image of the generated index image data is as shown in FIG. 3B.

Next, the controlling section 2 controls the management file creating section 24 to generate a management file that stores listing information of the document files to be transmitted and the file name of the document data with the use of character codes, on the basis of the document data and the file name stored in the data information storing section 21 (Step S8).

Next, the controlling section 2 controls the folder generating section 26 to generate a PC folder based on the document image file generated in the document image generating section 22, the index image file generated in the index image generating section 23, and the management file generated in the management file generating section 24 (Step S9). The generated PC folder has the content as shown in FIG. 4, and is based on DCF standard.

Next, the controlling section 22 controls the data transmitting section 27 to transmit the PC folder generated in the folder generating section 26 to the camera based on DCF standard (Step S10).

The transmitted PC folder data is recorded in the PC data recording region of the recording medium 53 via the data receiving section 52 of the digital camera 51.

B-2. Operations of Digital Camera 51

Figure 6:
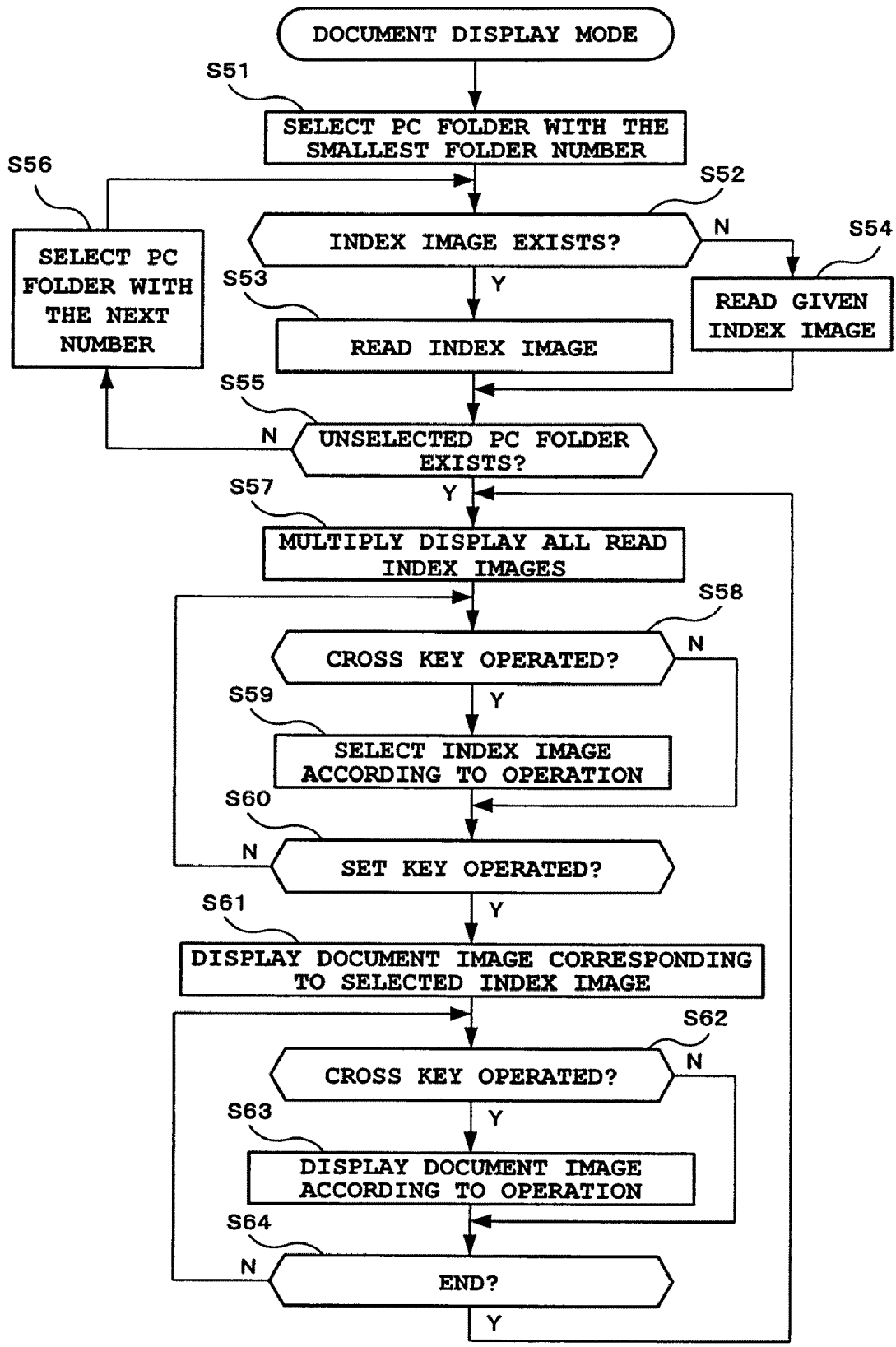
FIG. 6 is a flowchart showing operations of a digital camera 51 of the first embodiment.

Next, a description will be given of operations of the digital camera 51 according to the flowchart of FIG. 6.

The digital camera 51 records the respective files transmitted based on DCF standard in the PC data recording region of the recording medium 53. After that, in the default in which the document display mode is not set, the digital camera 51 deals these files as files storing usual captured images, and displays the captured images according to a reproduction instruction. Meanwhile, when the document display mode is set, the digital camera 51 deals these files as files storing image data representing the fine name of the original document file and a document content for every page, and operates as follows.

When the document display mode is set by a user's operation on the operating section 57, the controlling section 56 selects the PC folder with the smallest number out of the all PC folders recorded in the PC data recording region of the recording medium 53 (Step S1).

Figure 7:
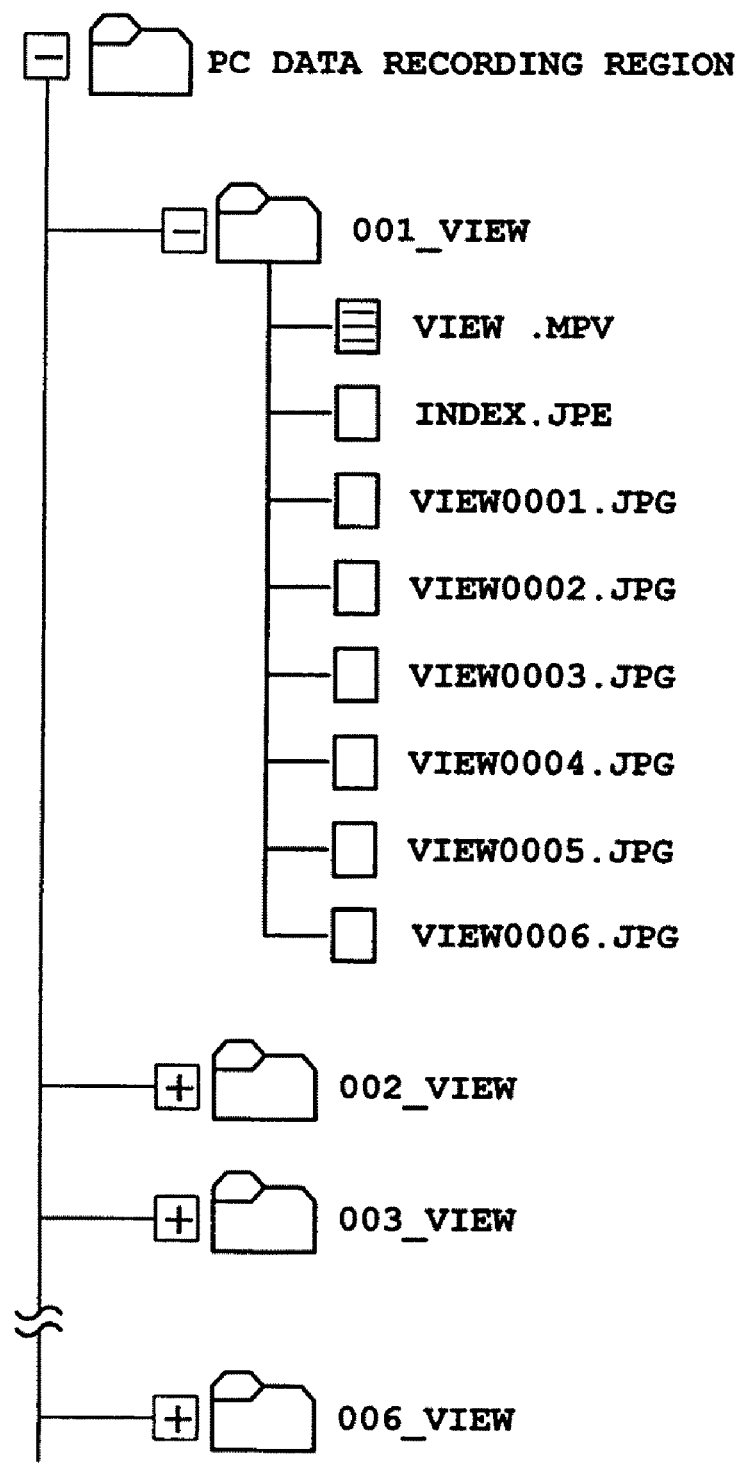
FIG. 7 is a view showing PC folders recorded in a PC data recording region of a recording medium 53.

FIG. 7 shows PC folders recorded in the PC data recording region of the recording medium 53. In the PC data recording region, 6 PC folders are recorded based on DCF standard.

As shown in FIG. 7, the folder name with the smallest number is "001_VIEW." Thus, the folder with the folder name "001_VIEW" is then selected.

Next, the controlling section 56 determines whether or not the index image "INDEX.JPE" exists in the selected PC folder (Step S52). The determination is made based on the extension of ".JPE."

When determining that the index image exists in Step S52, the index image data recorded in the selected PC folder is read and stored in the buffer memory of the controlling section 56, and then the procedure proceeds to Step S55. That is, the image data with the extension of ".JPE" is read.

Meanwhile, when determining that the index image does not exist in Step S52, previously recorded given image data is read and stored in the buffer memory, and then the procedure proceeds to Step S55.

In Step S55, the controlling section 56 determines whether or not any unselected PC folder exists in the PC data recording region.

When determining that an unselected PC folder exists in Step S55, the controlling section 56 selects the PC folder with the next number, that is, the PC folder with the next smallest number (Step S56), and then the procedure is returned back to Step S52.

By the foregoing operations, the index image data of the PC folder recorded in the PC data recording region is read. As for the PC folder with index image data unrecorded, instead of the index image data, the previously recorded given image data is read.

When determining that no unselected PC folder exists in Step S55, the controlling section 56 multiply displays all image data (index image data, and in some cases, given image data) recorded in the buffer memory on the image display section 58.

FIG. 3C shows the multiply displayed index images (icons).

"001_VIEW," "VIEW0001.JPG" and the like that are not directly related to the original document data are not displayed, but "企画書案.aaa" and the like that are directly related to the original document data are displayed. Therefore, by viewing the multiply displayed file names and icons, the user can recognize the file name and by which application software the image of the document data is created.

Further, the icon reading <unknown> in the figure is the given image data, and is the index image of the PC folder with the index image data unrecorded.

As described above, the character information generally incapable of being recognized as character information by the user with the use of only the camera function can be displayed as character information recognizable by the user in a desired position and in a desired size. That is, for example, when a file name (composed of half size alphanumerical characters) of a usual captured image file that is captured and recorded by the capturing function of the camera is displayed on the screen, respective character codes composing the file name are developed and rastarized according to character font information for half size alphanumerical characters installed in the camera, are composited as an image, and are arranged in a given position on the screen (display memory). Meanwhile, when a file name of document data transmitted from the personal computer is displayed, instead of the character font installed in the camera, the index image transmitted from the personal computer is used to display character information. This is achieved by the following factors. First, a given file transmitted from the personal computer in a given form is a character image corresponding to the file name of the document data. Secondly, the size of the character image in the given file and the number of characters vertically and horizontally included in the character image are previously defined between the personal computer and the digital camera.

When the index image data is multiply displayed, the controlling section 56 selects the icon of the PC folder with the smallest number. In addition, to clearly visualize the selected icon for the user, the icon is displayed differently from the other icons.

As shown in FIG. 3C, the icon of "企画書案.aaa" is surrounded with the frame, which means such an icon is selected.

When the index images are multiply displayed in Step S57, the controlling section 56 determines whether or not the user operates the cross keys (Step S58). Such determination is made based on whether or not an operation signal corresponding to operating the cross keys is sent from the operating section 57.

When determining that the user operates the cross keys in Step S58, the controlling section 56 selects an index image according to such an operation (Step S59), and the procedure proceeds to Step S60. That is, the index image to be selected is changed. In this case, again, the newly selected index image is displayed differently from the other index images (surrounded with a frame).

For example, in the state as shown in FIG. 3C, when "→" key out of the cross keys is pressed once, the icon of "quarterly sales prospect.bbb" is selected. Meanwhile, in the state as shown in FIG. 3C, when "↓" key of out of the cross keys is pressed once, the icon of "technical data.ccc" is selected.

Meanwhile, when determining that the user does not operate the cross keys in Step S58, the procedure directly proceeds to Step S60.

In Step S60, the controlling section 56 determines whether or not the user operates the SET key. The determination is made based on whether or not an operation signal corresponding to operation of the SET key is sent from the operating section 57.

Then, when the user desires to view the document content of the selected icon, the user operates the SET key.

When determining that the user does not operate the SET key in Step S60, the procedures is returned back to Step S58. That is, until the user operates the SET key, the user can freely change the icon to be selected.

Meanwhile, when determining that the user operates the SET key in Step S60, the controlling section 56 controls the image display section 58 to display the document image data recorded in the PC folder to which the currently selected icon (index image) belongs (Step S61). Then, out of the document image data recorded in the PC folder, the document image data with the smallest number is displayed.

For example, when the SET key is operated in a state that the index image of the PC folder "001_VIEW" is selected, the image data with the smallest number of "VIEW0001.JPG" is to be displayed.

Next, the controlling section 56 determines whether or not the user operates the cross keys (Step S62).

When determining that the user operates the cross keys in Step S62, document image data is displayed according to the operation (Step S63), and the procedure proceeds to Step S64. That is, according to operation of the cross keys, the document image data to be displayed is changed.

For example, when "↓" key out of the cross keys is operated, the document image data with the next number is displayed. Meanwhile, when "↑" key is operated, the document image data with the previous number is displayed. Thereby, the page to be displayed can be changed.

Meanwhile, when determining that the user does not operate the cross keys in Step S62, the procedure directly proceeds to Step S64.

In Step S64, the controlling section 56 determines whether or not displaying the currently displayed document is to be finished. When determining that displaying the currently displayed document is not to be finished, the procedure is returned back to Step S62. When determining that displaying the currently displayed document is to be finished, the procedure is returned back to Step S57.

The determination whether or not displaying the currently displayed document is to be finished is made based on whether or not an operation signal for finishing displaying the currently displayed document is sent from the operating section 57.

C. As described above, in the first embodiment, the document image data generated based on the document data and the index image data in which the name image data that images the file name and the icon image data are composited is recorded in the PC folder. Therefore, by viewing the index image data, the user can easily recognize what document the index image data represents, and can easily search for a desired document. In addition, the user can easily recognize by which application software the document is created.

The digital camera 51 multiply displays the index image data in which the file name image and an icon image are composited that is respectively recorded in each PC file. When index image data is selected, the document image data recorded in the same PC folder as that of the selected index image data is displayed. Therefore, the user can easily search for a desired document and can view the content of the document.

FIRST MODIFIED EXAMPLE

D. The foregoing first embodiment can be modified as the following modified examples.

1. In Step S7 of FIG. 5, the name image data is generated based on the file name, the generated name image data and the read icon image data are composited, and thereby the index image data is generated. Otherwise, the index image data may be generated based on only the file name. Then, the name image data may be directly used as the index image data. Otherwise, the index image data based on only the file name may be generated in the same size as that of the image data in which the name image data and the icon image data is composited.

In this case, in multiple display of the index image data on the digital camera 51 side, each file name of each document is multiply displayed.

It is possible that a user selects whether index image data in which an icon image is added to a file name is generated, or index image data composed of only the file name is generated, and the index image data is generated according to such a selection. In this case, it is possible to add information for the digital camera 51 to identify whether the index image data is added with the icon or the index image data is not added with the icon and is composed of only the file name.

2. In Step S57, the index image data of the PC folder (refer to FIG. 3B and FIG. 3C) is multiply displayed. Then, according to user's selection, out of the index image data, the image data corresponding to the file name section (name image data) may be clipped out and displayed. Thereby, the icon image is not displayed, and only the file name as shown in FIG. 3A is displayed.

Then, the digital camera 51 recognizes the icon image region and the file name image region of the index image data based on a given position and a given size, and clips out the name image data. Therefore, in the icon recording section 25 of the personal computer 1, the icon image data is recorded in the previously defined image size. The index image generating section 23 generates the name image data in the previously defined image size, generates the index image data, and accordingly, clips out the image of the file name section.

3. When characters of a file name out of index image are the characters recognizable by the digital camera (for example, half size alphanumeric characters), the controlling section 56 of the digital camera 51 may generate character data based on image data of the file name section of the index image data, and may delete the image data of the file name section from the index image data. Then, index image data after deleting the image data of the file name section (image data composed of only icon image) and the generated character data is recorded in association with each other. When the index image data is multiply displayed, the index image data after deleting the image data of the file name section is displayed, and the file name is displayed based on the character data recorded in association with the displayed index image data after deleting the image data of the file name section under the displayed index image data.

4. In the foregoing embodiment, the index image data generating section 23 composites the name image data generated based on the file name and the icon image data to generate the index image data. However, the name image data may be directly used as an index image. In this case, the folder generating section 26 may respectively read a document image file generated in the document image generating section 22, an index image file generated in the index image generating section 23, a management file generated in the management file generating section 24, and icon image data from the icon recording section 25 to create a PC folder.

In this case, it is possible that the digital camera 51 side generates composite image data based on the name image data as the index image data and the icon image data recorded in the PC folder (refer to FIG. 3B), and the composite image data is multiply displayed as shown in FIG. 3C.

In this case, when the file name based on the name image data as the index image data is recognizable by the digital camera 51, character data is generated based on the name image data and recorded in the PC folder. The name image data as the index is deleted from the PC folder. In multiple display, the icon image data in the PC folder is multiply displayed, and the file name based on the character data is displayed under the icon image data.

5. The icon recording section may be provided not only for the personal computer 1 side, but also for the digital camera 51 side.

In this case, it is possible that the index image generating section 23 sets name image data based on a file name as index image data. The digital camera 51 side generates the composite image data as shown in FIG. 3B based on the index image data and icon image data recorded in the icon recording section, and the generated composite image data is multiply displayed (refer to FIG. 3C).

In this case, when the file name based on the index image data is recognizable on the digital camera 51 side, character data may be generated and displayed in the same manner as in the foregoing fourth modified example.

6. In the foregoing third to fifth modified examples, only the file names may be multiply displayed, or the file names under the icon images may be multiply displayed.

7. When determining that the index image data is not recorded in the PC folder in Step S52 of FIG. 6, the controlling section controls to read the given index image data in Step S54. Otherwise, the personal computer 1 side may previously record the given index image data in the PC folder. Such an operation is made when determination is made that a file name and an icon image corresponding to the application software do not exist.

8. Applications of the foregoing embodiment are not limited to the digital camera 1. As long as an apparatus includes a function to display an image, the embodiment of the present invention may be applied to a mobile phone, a PDA, a personal computer, a digital video camera and the like.

When document image data is transmitted to an apparatus other than a capture apparatus, processing may be changed according to the apparatus receiving the document image data. For example, when the receiving side is a personal computer, document image data is not necessarily generated. Thus, in this case, it is enough to directly transmit document data.

9. In the personal computer 1, before document image data and index image data to be transmitted to the digital camera 51 is created, model information on the digital camera 51 may be acquired. According to the model information, the image size (aspect ratio), sharpness, chroma, character color, background color, density of background color, surrounding margin of the image and the like of the document image data or the index image data may be changed.

10. In the personal computer 1, when document image data is transmitted to the digital camera 51, information on the application software by which the document image data is created may be additionally transmitted. In this case, when the digital camera 51 receives the document image data, the digital camera 51 may change the reproduction method based on the added information on the application software. For example, when document image data is generated by designating a print driver for creating the document image data and executing print by application software A, in the case that such document image data is reproduced by the digital camera 51, the upper left section of the document image data is displayed with the use of fourfold zoom. Thereby, in the case that the application software shows important information that is intensively located on the upper left section of the document image data, the important section can be easily checked on the screen of the digital camera 51.

Second Embodiment

Next, a description will be given of a second embodiment.

E. Structure of Data Processing System

Figure 8:
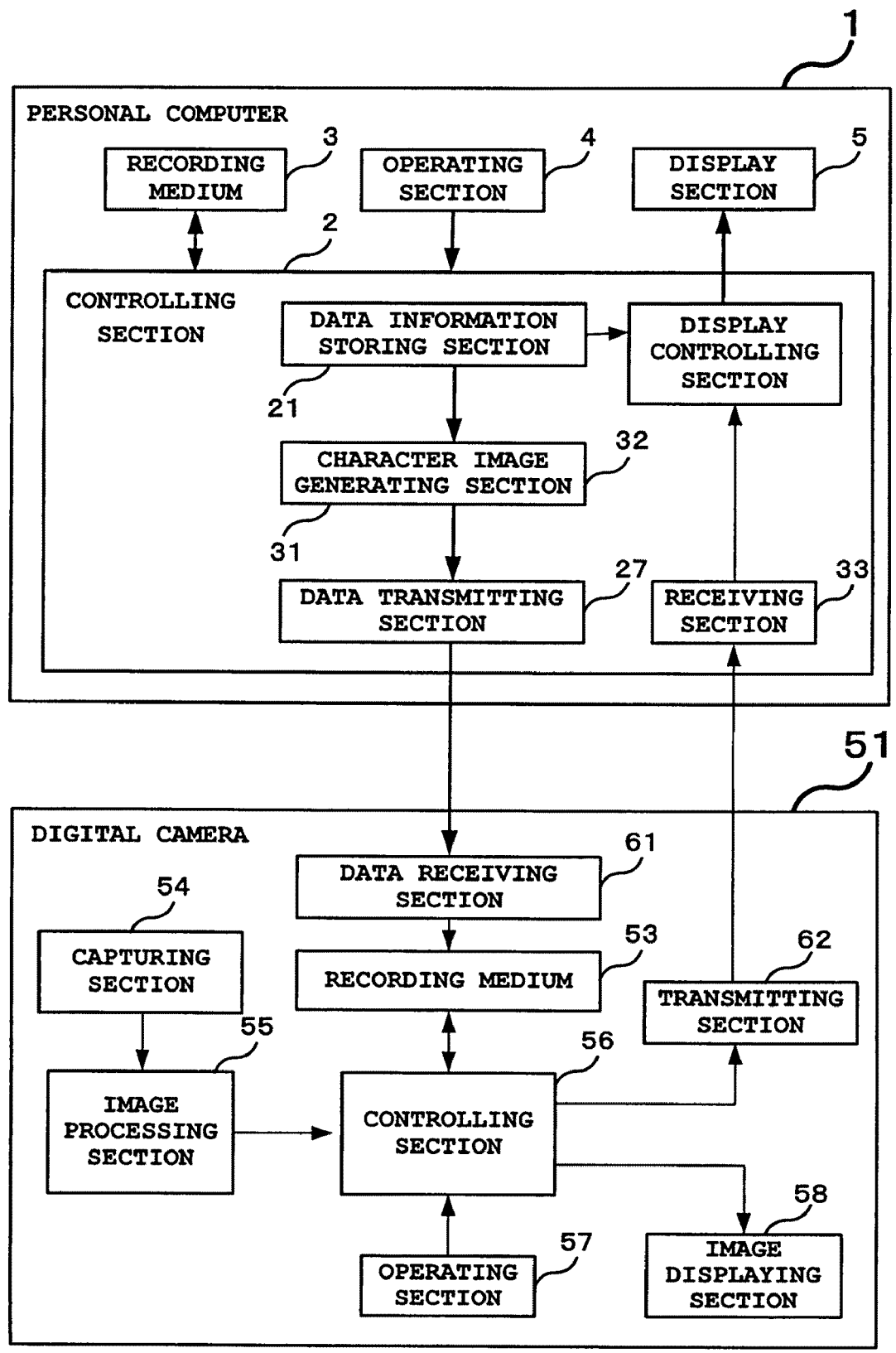
FIG. 8 is a diagram showing a schematic structure of a data processing system according to a second embodiment of the present invention.

FIG. 8 is a diagram showing a schematic structure of a data processing system of the second embodiment.

The data processing system includes the personal computer 1 and the digital camera 51.

The personal computer 1 is composed of the controlling section 2, the recording medium 3, the operating section 4 (an input means), and the display section 5. The controlling section 2 (a reception determining means) has the data information storing section 21, the data transmitting means 27 (a transmitting means), a character image generating section 31 (a character image generating means), a display controlling section 32, and a receiving section 33.

The digital camera 51 includes the recording medium 53, the capturing section 54, the image processing section 55, the controlling section 56 (a capture controlling means, the image storing means, the property display means, the property image acquiring means, the property code acquiring means, a document image acquiring means, a first record controlling means, the record controlling means, the display controlling means, and a determining means), the operating section 57, the image display section 58, a data receiving section 61 (a receiving means), and a transmitting section 62 (a transmitting means).

For the elements similar to those of the first embodiment, similar symbols are affixed thereto.

First, a description will be given of a structure of the digital camera 51.

The capturing section 54 includes an optical lens, a CCD, an A/D and the like. The capturing section 54 converts an image of an object that is imaged via the lens to an electrical signal, and outputs the image as image data of a digital signal to the image processing section 55.

The image processing section 55 provides processing such as γ correction processing and white balance processing for the sent image data. The image processing section 55 generates a luminance color difference signal (YUV data), and outputs image data of the generated luminance color difference signal to the controlling section 56.

The controlling section 56 is a one chip micro computer that records the sent image data in the image recording region of the recording medium 53, displays the sent image data on the image display section 58, and controls the respective sections of the digital camera 51.

The operating section 57 includes a plurality of operation keys such as a shutter button, a mode key, cross keys, a SET key, and an edit key. The operating section 57 sends an operation signal corresponding to a key operation to the controlling section 56.

The data receiving section 61 records image data sent from the data transmitting section 27 of the personal computer 1 as property information of captured image data recorded in the recording medium 53 (image data captured by the digital camera or the like) in association with the captured image data.

The transmitting section 62 transmits a signal for editing on the personal computer side to the receiving section 33 of the personal computer 1 according to a control signal of the controlling section 56.

First, the controlling section 56 controls the image display section 58 to display property information of the selected captured image data out of a plurality of captured image data recorded in the recording medium 53 (image data captured by the digital camera or the like).

Figure 9A:
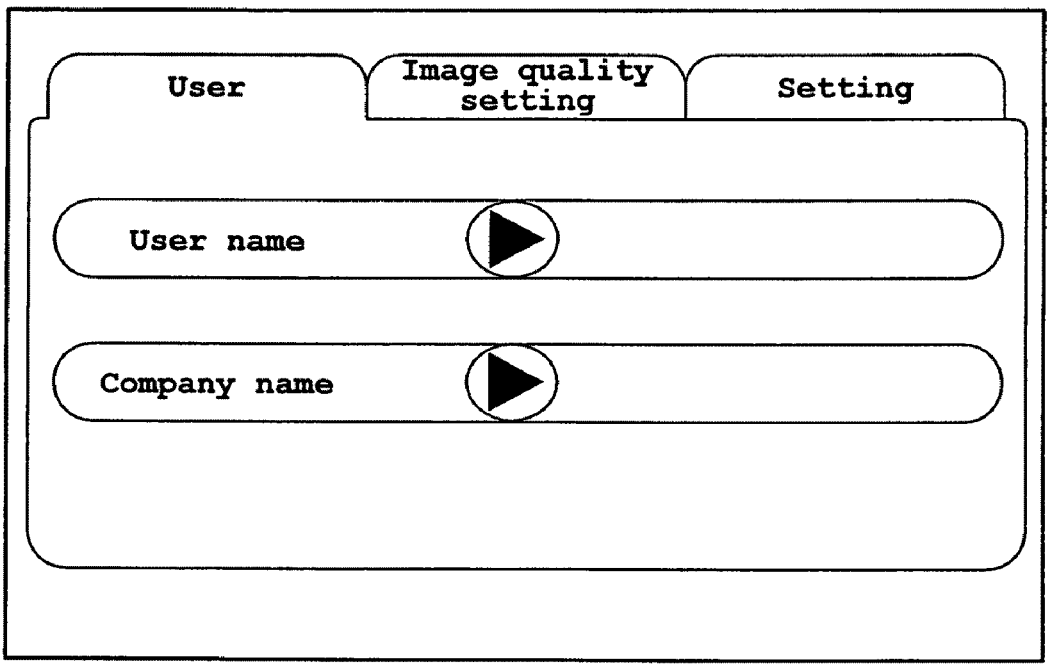
FIGS. 9A and 9B are views showing property information shown on an image display section 58.

FIG. 9A shows the property information displayed on the image display section 58.

As evidenced by FIG. 9A, a plurality of property information such as user information, image quality setting information, and setting information can be displayed. In the figure, the user information is displayed. As the user information, detail items of "User name" and "Company name" are shown. By operating the cross keys, the displayed property information is changed from "User" to "Image quality setting." By further operation, "Setting" is displayed. In the image setting, the image quality when the image is captured has been automatically added as the property information.

In a state that one of property information (one of "User," "Image quality," and "Setting") is displayed, when the edit key on the operating section 57 is operated (when an operation signal corresponding to operating the edit key is sent), the controlling section 56 switches to the edit mode of the displayed property information. Then, out of the displayed detail items, one item is automatically selected, and the selected detail item is displayed differently from the other detail item. Thereby, the user can recognize such a differently displayed detail item being selected.

When switching to the edit mode, the controlling section 56 determines whether or not the cross keys are operated until the SET key is operated. When determining that the cross keys are operated, the detail item to be selected is changed according to operation of the cross keys. For example, in a state that "User name" is selected, when "↑" key out of the cross keys is operated, selection of "User name" is released, "Company name" is selected, and the selected "Company name" is differently displayed. Such determination of whether or not the cross keys are operated is made based on determination of whether or not an operation signal corresponding to operation of the cross keys is sent from the operating section 57.

When switching to the edit mode, the controlling section 56 determines whether or not the SET key is operated. Such determination is made based on determination whether or not an operation signal corresponding to operation of the SET key is sent from the operating section 57.

When the SET key is operated, the controlling section 56 sets the currently selected detail item as the edit target item. In addition, the controlling section 56 determines whether the detail item set as the edit target is to be edited by directly inputting characters on the digital camera 51 side, or the detail item set as the edit target is to be edited by inputting characters on the PC (personal computer 1) side.

Then, the controlling section 56 controls the image display section 58 to display a screen for selecting direct input (direct input on the digital camera 51) or PC input (input on the personal computer side). Then, one of the direct input and the PC input is automatically selected, and the selected input method is differently displayed.

Figure 9B:
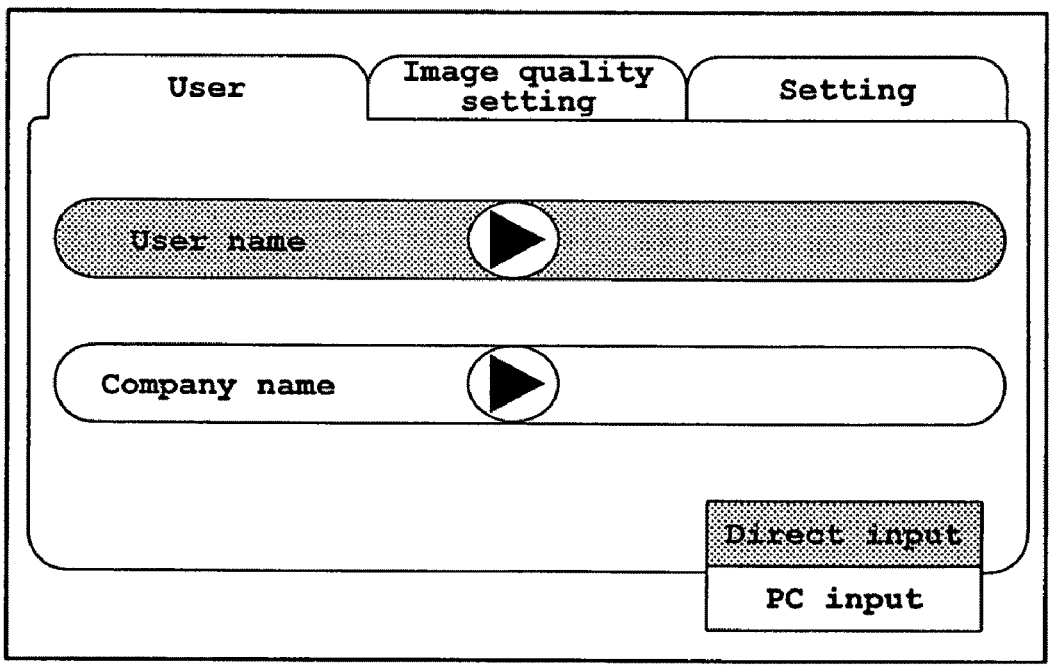

FIG. 9B shows a state that the SET key is operated when the user name is selected (the user name is differently displayed with hatching). In the figure, the screen for selecting direct input or PC input is shown. In the figure, direct input is automatically selected and differently displayed (displayed with hatching).

Then, when the cross keys are operated, the selected input method is switched from direct input to PC input. When the cross keys are further operated, the selected input method is switched from PC input to direct input. That is, the selected input method is switched alternately according to operation of the cross keys. It is needless to say that the selected input method is differently displayed.

When desiring to edit characters unregistered in the digital camera 51 (in this case, full and half size Japanese katakana, full size Japanese hiragana, and Chinese characters), the user selects PC input. When editing the characters registered in the digital camera 51 (in this case, half size alphanumeric characters), the user selects direct input.

When the SET key is operated in a state that PC input is selected, the controlling section 56 controls the transmitting section 62 to transmit a signal for editing on the personal computer side. The transmitted signal is received by the receiving section 33 of the personal computer 1.

When the personal computer 1 receives the signal, a screen for inputting characters is displayed thereon. Thus, the user can input characters on the personal computer 1 side. When inputting the characters is completed, the inputted characters are imaged to generate character image data, which is sent to the digital camera 1 side. Such an operation on the personal computer side will be described in detail later.

The data receiving section 61 determines whether or not the character image data is sent from the personal computer 1. When determining that the character image data is sent from the personal computer 1, the data receiving section 61 records the sent name image data as property information of the selected captured image data (captured image data as an origin of the property information) in association with the captured image data. Then, the name image data is recorded as information of the detail item set as the edit target item. In this case, the sent character image data is character image data obtained by imaging characters "デジカメ 太郎."

Figure 10A:
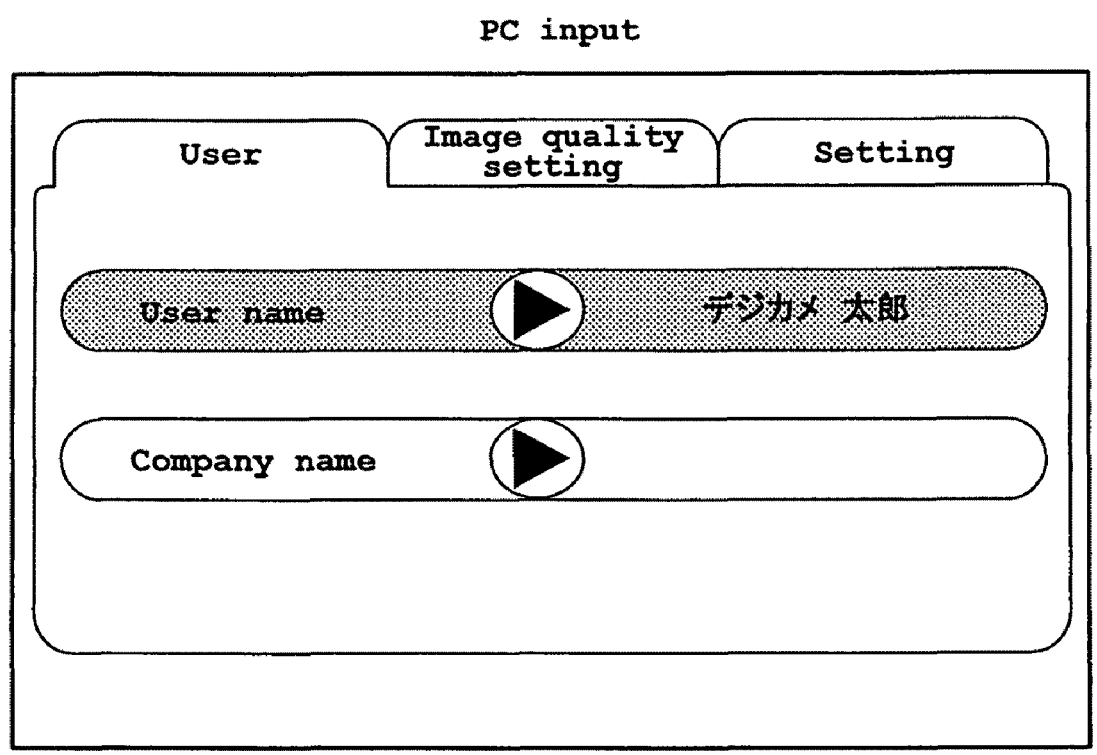
FIGS. 10A, 10B, and 10C are views showing property information after edit by PC input and direct input.

Then, the controlling section 56 controls to display the character image data recorded in association with the captured image data in the detail item set as the edit target item as shown in FIG. 10A.

Meanwhile, when the SET key is operated in a state that direct input is selected instead of PC input, the controlling section 56 controls to display the screen on which the detail item set as the edit target item can be inputted in the text-input mode.

Figure 10B:
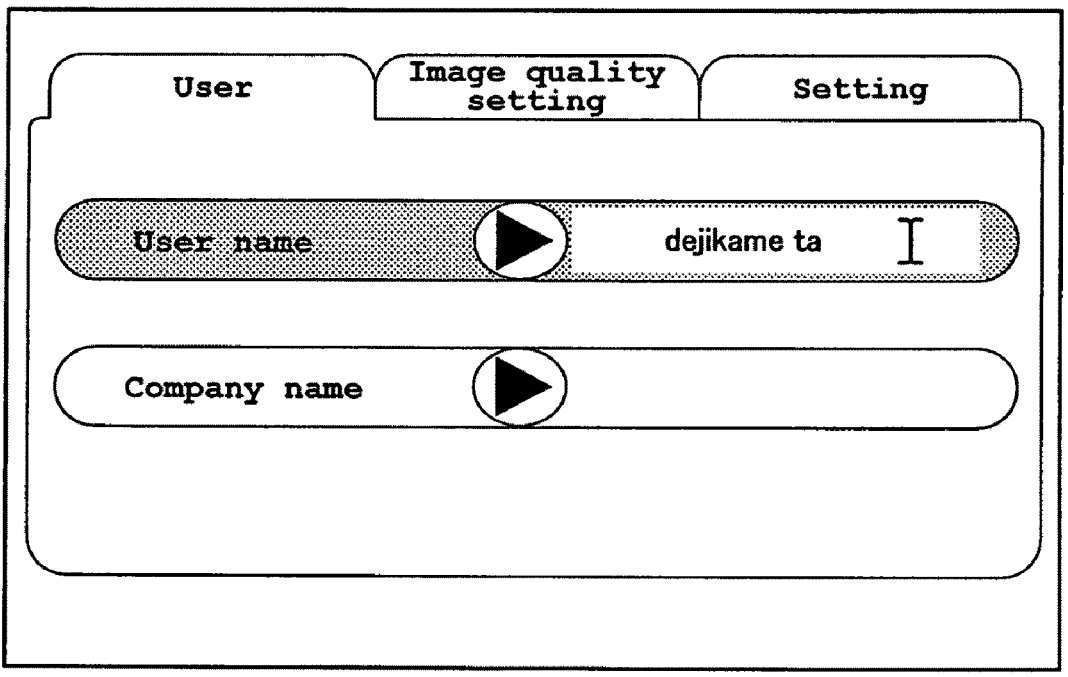
Figure 10B:
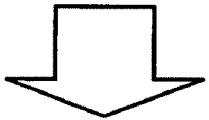

Then, the user can input characters by operating the cross keys and the like. FIG. 10B is a view showing the state that the characters are currently inputted. The character data inputted by the user's operation is stored in the buffer memory included in the controlling section 56, and is displayed based on the stored character data.

When displaying the screen on which the detail item set as the edit target item can be inputted in the text-input mode, the controlling section 56 determines whether or not the SET key is operated by the user.

When the user determines that the characters are completely inputted, the user can complete edit by operating the SET key. In this case, the user inputs "dejikame tarou," and then operates the SET key.

When determining that the SET key is operated, the controlling section 56 records the inputted character data (character data stored in the buffer memory in operating the SET key) as additional information of the captured image data in association with the captured image data. Then, the inputted character data is recorded as information of the detail item set as the edit target item.

Figure 10C:
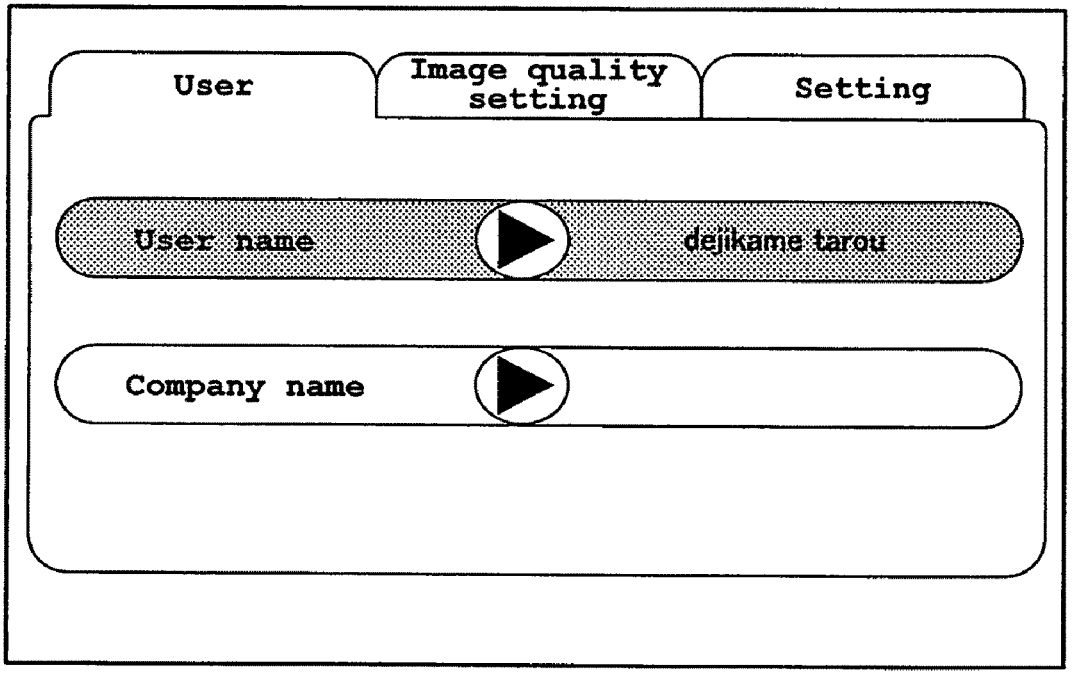

FIG. 10C shows the inputted characters that are displayed after operating the SET key.

Characters based on the character data recorded in association with the captured image data are displayed in the detail item set as the edit target.

Next, a description will be given of the personal computer 1.

The recording medium 3 is an internal memory for storing data such as hard disk and nonvolatile memory data. In the recording medium 3, character input application software for generating character image data to be transmitted to the digital camera 51 is installed.

The operating section 4 includes a mouse and a keyboard, and outputs an operation signal according to a user's operation to the controlling section 2.

The display section 5 displays a screen for inputting characters based on the character input application software.

When the receiving section 33 of the controlling section 2 receives a signal for editing on the personal computer side sent from the transmitting section 62 of the digital camera 51, the receiving section 33 outputs a signal for displaying a screen based on the character input application software to the display controlling section 32.

When the display controlling section 32 receives the signal for displaying the screen based on the character input application software from the receiving section 33, the display controlling section 32 starts the character input application software, and controls the display section 5 to display the screen based on the character input application software.

Figure 11A:
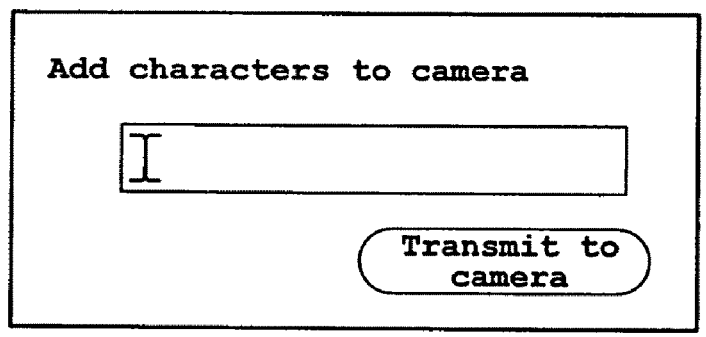
FIGS. 11A and 11B are views showing screens displayed based on character input application software.
Figure 11A:
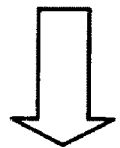

FIG. 11A shows a state of the screen displayed then. The column (text input column) in the text input mode of FIG. 11A is a section on which characters inputted on the operating section 4 are displayed. The button "Transmit to camera" is the button for transmitting the inputted characters.

The screen based on the character input application software is displayed, and the button "Transmit to camera" is clicked. Until then, the controlling section 2 determines whether or not the characters are inputted by user's operation on the operating section 4. When determining that the input is made, character data according to the input is stored in the data information storing section 21. The display controlling section 32 controls to display the characters based on the character data stored in the data information storing section 21 in the character input column.

For example, when characters "デジカメ" are inputted by operation on the keyboard of the operating section 4, the character data "デジカメ" is temporarily stored in the data information storing section 21 according to the inputted characters. The display controlling section 32 controls to display the characters "デジカメ" in the character input column based on the character data stored in the data information storing section 21.

Further, the controlling section 2 determines whether or not the button "Transmit to camera" is clicked by user's operation of the mouse in the operating section 4. When determining that the button is clicked, the controlling section 2 controls the character image generating section 31 to generate image data (character image data) based on the character data currently stored in the data information storing section 21. The character image generating section 31 generates the character image data according to the font and the size that are previously defined.

The font and the size have been previously defined so that the generated character image data is filled within the detail item column as shown in FIG. 9A.

Figure 11B:
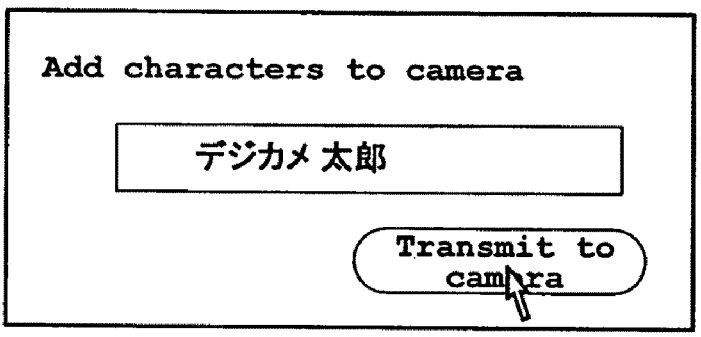

FIG. 11B shows a state of the screen when the button "Transmit to camera" is clicked. In the character input column, "デジカメ 太郎" is displayed. Therefore, based on the character data of the displayed "デジカメ 太郎," the character image data is generated.

Then, the controlling section 2 makes the data transmitting section 27 transmit the character image data generated by the character image generating section 31 to the data receiving section 61 of the digital camera 51.

As described above, the data receiving section 61 records the sent character image data as the property information of the captured image data in association with the captured image data.

F. Operations of Data Processing System

A description will be given of operations of the data processing system in the second embodiment.

First, a description will be given of operations of the digital camera 51. After that, a description will be given of operations of the personal computer 1.

F-1. Operations of Digital Camera 51

The operations of the digital camera 51 will be described according to the flowchart of FIG. 12.

The controlling section 56 determines whether or not the property information of the selected captured image data out of a plurality of captured image data recorded in the recording medium 53 is to be displayed (Step S101).

When determining that the property information is to be displayed in Step S101, the controlling section 56 controls to display the property information of the selected captured image data (Step S102). The property information is recorded in association with the captured image data.

As evidenced by FIG. 9A, the user information is displayed as property information. Detail items of the user information, "User name" and "Company name" are displayed. By operating the cross keys, the displayed property information is switched in the order of "User," "Image quality setting," and "Setting."

Next, the controlling section 56 determines whether or not the edit key of the operating section 57 is operated (Step S103). The determination is made based on whether or not an operation signal corresponding to operation of the edit key is sent from the operating section 57.

When determining that the edit key is not operated in Step S103, the procedure is stopped at Step S103 until determining that the edit key is operated. When determining that the edit key is operated, the controlling section 56 switches to edit mode (Step S104). Then, one of the displayed detail items is automatically selected as an edit target, and the selected detail item is displayed differently from other detail items. In this case, when the user information is displayed as the property information, the edit key is operated.

Next, the controlling section 56 determines whether or not the cross keys are operated (Step S105). Such determination is made based on whether or not an operation signal corresponding to operation of the cross keys is sent from the operating section 57. Thereby, the user can select the detail item as the edit target.

When determining that the cross keys are operated in Step S105, the controlling section 56 changes selection of the detail item according to such an operation (Step S106), and the procedure proceeds to Step S107. For example, when the cross keys are operated in a state that "User name" is selected, selection of "User name" is released, and "Company name" is selected. It is needless to say that the newly selected detail item is newly displayed differently from the other detail item.

Meanwhile, when determination is made that the cross keys are not operated in Step S105, the procedure directly proceeds to Step S107.

In Step S107, the controlling section 56 determines whether or not the SET key is operated. Such determination is made based on whether or not an operation signal corresponding to operating the SET key is sent from the operating section 57.

When determining that the SET key is not operated in Step S107, the procedure is returned back to Step S105.

That is, when switching to the edit mode, the detail item as an edit target can be freely selected or changed until the SET key is operated.

Meanwhile, when determining that the SET key is operated in Step S107, the controlling section 56 sets the currently selected detail item as the edit target item, and determines whether or not the detail item is to be edited by PC input (Step S108).

Then, the controlling section 56 displays a screen for selecting PC input or direct input. When PC input is selected, the controlling section 56 determines that the detail item is to be edited by PC input.

FIG. 9B shows a display example of the screen for selecting PC input or direct input. The hatched section indicates the currently selected input method. When the user operates the cross keys then, selection is switched. That is, when direct input is selected, the selection is switched to PC input by operating the cross keys. Meanwhile, when the PC input is selected, the selection is switched to direct input by operating the cross keys. When the SET key is operated, the currently selected input method is determined.

When determining that PC input is selected in Step S108, the controlling section 56 controls the transmitting section 62 to send a signal for editing on the personal computer side (Step S109).

Next, the controlling section 56 determines whether or not character image data is sent from the personal computer 1 to the data receiving section 61 (Step S110).

When determining that the character image data has not been sent in Step S110, the procedure is stopped in Step S110 until the character image data is sent. When determining that the character image data has been sent, the controlling section 56 controls the data receiving section 61 to record the sent character image data as the property information of the selected captured image data of Step S101 in the recording medium 53 in association with the captured image data (Step S111). Then, the sent character image data is recorded as information of the detail item set as the edit target item in Step S107.

In this case, the character image data obtained by imaging characters "デジカメ 太郎" have been sent.

Next, as shown in FIG. 10A, the controlling section 56 displays the recorded character image data in the detail item set as the edit target item (Step S112). The procedure is returned back to Step S105, a detail item as an edit target item is again selected, and the foregoing operations are repeated.

Meanwhile, when determining that direct input is selected instead of PC input in Step S108, the controlling section 56 determines whether or not character input operation is made (Step S113).

Then, the control section 56 can controls to display the screen on which the detail item set as the edit target item can be inputted in the text input mode. Thus, the user can input characters by operating the cross keys and the like.

When determining that the character input operation is made in Step S113, the controlling section 56 displays characters according to the operation (Step S114), and the procedure proceeds to Step S115. Then, character data is stored in the buffer memory included in the controlling section 56 according to the input characters, and the characters are displayed based on the recorded character data.

FIG. 10B shows a state that the characters are currently inputted.

Meanwhile, when determining that the character input operation is not made in Step S113, the procedure directly proceeds to Step S115.

In Step S115, the controlling section 56 determines whether or not the SET key is operated.

When the user thinks the inputted characters are OK, the user operates the SET key to be able to complete edit.

When determining that the SET key is not operated in Step S115, the procedure is returned back to Step S113, and the foregoing operations are repeated.

That is, until operating the SET key, the user can input characters or can change the inputted characters. Accordingly, character data stored in the buffer memory and displayed characters are changed.

When determining that the SET key is operated in Step S115, the controlling section 56 controls the recording medium 53 to record the character data (displayed character data) currently stored in the buffer memory as the property information of the selected captured image data of Step S101 in association with the captured image data (Step S116). The procedure is returned back to Step S105, a detail item as an edit target item is selected again, and the foregoing operations are repeated.

In recording in Step S116, the character data is recorded as the information of the detail item set as the edit target item.

F-2. Operations of Personal Computer 1

A description will be given of operations of the personal computer 1 according to the flowchart of FIG. 13.

The receiving section 33 of the controlling section 22 determines whether or not a signal for editing on the personal computer side is sent from the digital camera 51 (Step S151).

Figure 12:
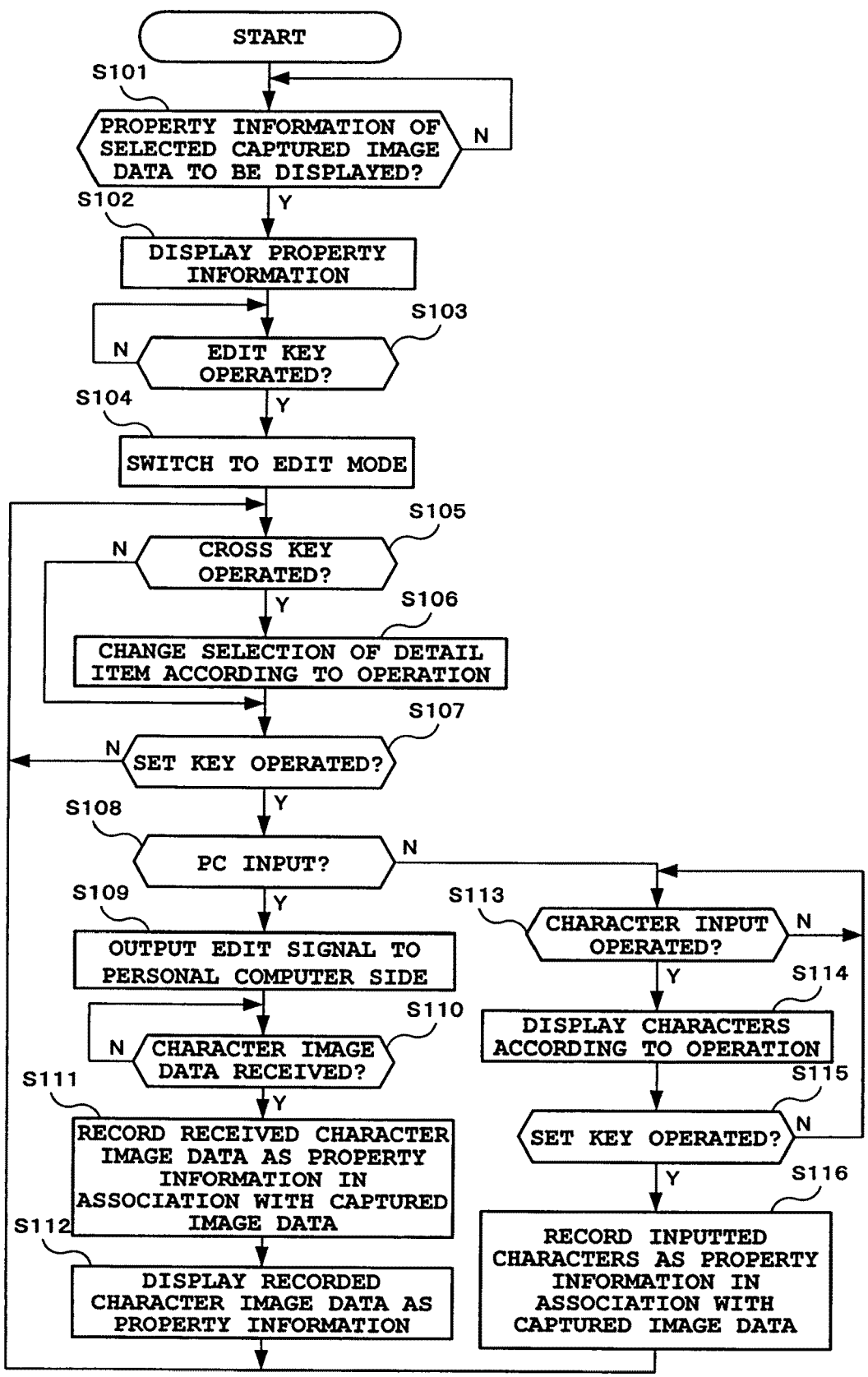
FIG. 12 is a flowchart showing operations of the digital camera 51 of a second embodiment.

When determining that the signal for editing on the personal computer side is sent in Step S151, that is, when the transmitting section 62 transmits the signal for editing on the personal computer side in Step S109 of FIG. 12, the receiving section 33 outputs a signal for displaying a screen based on the character input application software to the display controlling section 32. When the display controlling section 32 receives the signal, the display controlling section 32 starts character input application software for editing characters to display a screen for inputting characters on the display section 5 (Step S152).

FIG. 11A shows the screen displayed then. Inputted characters are to be displayed in the column in the text input mode (character input column). The button "Transmit to camera" is the button for transmitting the inputted characters to the digital camera.

Next, the controlling section 2 determines whether or not character input operation is made (Step S153).

The determination is made based on whether or not an operation signal for inputting characters is sent according to operation of the keyboard of the operating section 4.

When determining that the character input operation is made in Step S153, controlling section 2 displays the characters in the character input column according to the operation (Step S154), and the procedure proceeds to Step S155. Then, the controlling section 2 temporarily stores character data in data information storing section 21 according to the inputted characters. The display controlling section 33 displays the characters based on the character data stored in the data information storing section 21.

For example, when characters "デジカメ" are inputted, the controlling section 2 controls the data information storing section 21 to store character data of the characters "デジカメ". The display controlling section 33 controls to display the characters "デジカメ" in the character input column based on the character data stored in the data information storing section 21.

Meanwhile, when determining character input operation is not made, the procedures directly proceeds to Step S155.

In Step S155, determination is made whether or not the characters are to be transmitted to the camera. The determination is made based on whether or not the button "Transmit to camera" is clicked by operating the mouse of the operating section 4.

When determining that the characters are not to be transmitted to the camera in Step S155, the procedure is returned back to Step S153. That is, until clicking the button "Transmit to camera", the user can input characters or change the inputted characters. According to the user's operation, the character data stored in the data information storing section 21 and the characters displayed on the display section 5 are changed.

Meanwhile, when determining that the characters are to be transmitted to the camera in Step S155, based on the character data stored in the data information storing section 21 (data of the characters displayed in the character input column), the character image generating section 31 generates character image data obtained by imaging the characters (Step S156). Then, the character image data is generated according to the font and the size that are previously defined.

FIG. 11B shows the displayed screen when determining that the characters are to be transmitted to the camera. In the character input column, "デジカメ 太郎" is displayed. Therefore, image data obtained by imaging character data of the displayed "デジカメ 太郎" is to be generated.

Next, the data transmitting section 27 transmits the character image data generated by the character image generating section 31 to the data receiving section 61 of the digital camera 51.

As described above, the data receiving section 61 records the sent character image data as property information of the captured image data in association with the captured image data.

G. As described above, in the second embodiment, based on the character data of the characters inputted in the personal computer 1, the character image data is generated by imaging the characters. The digital camera 51 records the generated character image data as the property information of the captured image data in association with the captured image data. Therefore, when characters are inputted as the property information of the captured image data and the characters are not displayed and inputted on the digital camera 51, such characters can be displayed as the property information.

FIRST MODIFIED EXAMPLE

H. The Foregoing Second Embodiment can be Modified as the Following Modified Example.

1. When determination is made that PC input is selected in Step S108 of FIG. 12, the signal for editing on the personal computer side is outputted to the personal computer 1 (Step S109). When the personal computer 1 receives the signal in Step S101 of FIG. 13, the personal computer 1 starts the application software to edit characters and displays the screen for editing the characters in Step S102. Otherwise, it is possible that the application software is started by direction of the user, and thereby the screen for editing the characters is displayed.

In this case, when the button "Transmit to camera" is clicked, character image data obtained by imaging the characters inputted by the user is generated. The character image data is transmitted to the digital camera 51. The digital camera 51 records the sent character image data in the recording medium 53.

When determination is made that PC input is selected in Step S108, the digital camera 51 side displays a list of character image data recorded in the recording medium. The user selects desired character image data. The selected character image data is recorded as property information of captured image data that is the origin of the displayed property information, in association with the captured image data. The recorded character image data is displayed as the property information. Then, as information of the detail item set as an edit target item, the character data is recorded. The recorded character image data is displayed in the detail item column.

2. The present invention is not limited to the digital camera 1 in the foregoing embodiment. The present invention can be applied to any apparatus including a function to capture an object such as a mobile phone with a camera, a PDA with a camera, a personal computer with a camera, and a digital video camera.

Furthermore, although the data of the computer program product which is a preferred embodiment of the present invention is stored in the memory (for example, ROM, etc.) of the personal computer and digital camera, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. A data processing system comprising a data processing device and a capture apparatus for displaying character image data generated by the data processing device on the capture apparatus,
wherein the data processing device comprises:
an inputting section for inputting characters by a user;
a character image generating section which generates the character image data obtained by imaging the characters inputted by the inputting section based on character data of the characters; and
a transmitting section which transmits the character image data generated by the character image generating section,
wherein the capture apparatus comprises:
a capture controlling section for capturing an object;
a first record controlling section which records image data captured by the capture controlling section in a recording medium;
a receiving section for receiving the character image data transmitted from the transmitting section;
a second record controlling section which records the character image data received by the receiving section as property information of the captured image data recorded in the recording medium, in association with the captured image data;
a display controlling section which displays on a display section the character image data that is recorded, as the property information of the captured image data recorded in the recording medium, in association with the captured image data;
a determining section which determines whether or not characters are to be inputted on the data processing device; and
a transmitting section which transmits a signal for inputting the characters on the data processing device when the determining section determines that the characters are to be inputted on the data processing device,
wherein the data processing device further comprises a receiving determining section which determines whether or not the signal for inputting the characters is transmitted from the transmitting section of the capture apparatus,
wherein the character image generating section generates the character image data obtained by imaging the characters inputted by the inputting section based on the character data of the characters, when the receiving determining section determines that the signal for inputting the characters is transmitted, and
wherein the transmitting section of the data processing device transmits the character image data generated by the character image generating section, when the receiving determining section determines that the signal for inputting the characters is transmitted from the capture apparatus.

* * * * *